(12) United States Patent
Compton

(10) Patent No.: US 12,069,092 B2
(45) Date of Patent: Aug. 20, 2024

(54) NETWORK SECURITY ATTACK DETECTION AND MITIGATION SOLUTION USING HONEYPOTS

(71) Applicant: Charter Communications Operating, LLC, St. Louis, MO (US)

(72) Inventor: Richard A. Compton, Highlands Ranch, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/175,785

(22) Filed: Oct. 30, 2018

(65) Prior Publication Data

US 2020/0137112 A1 Apr. 30, 2020

(51) Int. Cl.
*H04L 9/40* (2022.01)
(52) U.S. Cl.
CPC ...... *H04L 63/1491* (2013.01); *H04L 63/1458* (2013.01); *H04L 2463/141* (2013.01)
(58) Field of Classification Search
CPC ............. H04L 63/1416; H04L 12/4666; H04L 2463/141; H04L 63/1458; H04L 63/1491; G06F 21/554
USPC .......................................................... 726/23
See application file for complete search history.

(56) References Cited

U.S. PATENT DOCUMENTS

| | | | | |
|---|---|---|---|---|
| 8,615,785 B2 * | 12/2013 | Elrod | ................ | H04L 63/1416 370/245 |
| 8,661,102 B1 * | 2/2014 | Steiner | ................ | H04L 63/145 709/201 |
| 9,350,758 B1 * | 5/2016 | Aharoni | ................ | G06F 21/577 |
| 9,621,577 B2 * | 4/2017 | Akcin | .................... | H04L 63/10 |
| 10,116,693 B1 * | 10/2018 | Robinson | ................ | H04L 67/42 |
| 2002/0184528 A1 * | 12/2002 | Shevenell | ........... | H04L 63/1416 726/6 |
| 2005/0050353 A1 * | 3/2005 | Thiele | .................. | G06F 21/554 726/4 |
| 2008/0253380 A1 * | 10/2008 | Cazares | ............. | H04L 12/4666 370/395.53 |

(Continued)

FOREIGN PATENT DOCUMENTS

WO WO-2014055337 A1 * 4/2014 ............. H04L 47/22

OTHER PUBLICATIONS

Johannes Krupp, Honeypot-based Monitoring of Amplification DDOS Attacks, Jun. 19, 2018, pp. 1-8, RIPE Labs.
Unpublished U.S. Appl. No. 15/692,854, Richard A. Compton, "Distributed Denial-of-Service Attack Detection and Mitigation Based on Autonomous System Number," filed Aug. 31, 2017, pp. 1-27 plus 5 sheets drawings.

(Continued)

*Primary Examiner* — Bryan F Wright
(74) *Attorney, Agent, or Firm* — Otterstedt & Kammer PLLC

(57) ABSTRACT

A system and method for mitigating a distributed denial-of-service (DDoS) attack in a networked computing system. At least one DDoS honeypot in operative communication with a central controller in the networked computing system is configured to receive a data packet from a network, determine a source address of the data packet, and send the source address to the central controller. The central controller is configured to initiate a mitigation action based on the source address and one or more mitigation rules, wherein a determination of whether the received data packet is part of the DDoS attack is based on one or more detection rules.

21 Claims, 5 Drawing Sheets

(56) References Cited

U.S. PATENT DOCUMENTS

| | | | | |
|---|---|---|---|---|
| 2014/0096251 | A1* | 4/2014 | Doctor | G06F 21/55 726/23 |
| 2015/0128246 | A1* | 5/2015 | Feghali | H04L 63/0209 726/13 |
| 2016/0036837 | A1* | 2/2016 | Jain | H04L 63/1416 726/23 |
| 2016/0164896 | A1* | 6/2016 | Baldonado | H04L 63/1425 726/23 |
| 2016/0173527 | A1* | 6/2016 | Kasman | H04L 63/1416 726/23 |
| 2017/0339186 | A1* | 11/2017 | Gurvich | H04L 67/1097 |
| 2018/0084005 | A1* | 3/2018 | Dousti | H04L 63/1458 |
| 2018/0124073 | A1* | 5/2018 | Scherman | H04L 63/1491 |
| 2018/0338274 | A1* | 11/2018 | Gallagher | H04W 48/02 |
| 2018/0356837 | A1* | 12/2018 | Lisewski | H04L 9/3213 |
| 2020/0067974 | A1* | 2/2020 | Konda | H04L 63/20 |

OTHER PUBLICATIONS

"Autonomous system (Internet)," Wikipedia, https://en.wikipedia.org/wiki/Autonomous_system_(Internet), pp. 1-3, May 4, 2017.
Geoff Huston, "Exploring Autonomous System Numbers," The Internet Protocol Journal, May 4, 2017, pp. 1-10, vol. 9, No. 1, Cisco.
Unpublished U.S. Appl. No. 15/692,762, Richard A. Compton, "Distributed Denial-of-Service Attack Detection and Mitigation Based on Autonomous System Number," filed Aug. 31, 2017, pp. 1-25 plus 5 sheets drawings.
"Defeating DDOS Attacks," White Paper, Cisco Systems, Inc., 2004, pp. 1-11.
Linda Musthaler, "Best Practices to Mitigate DDOS Attacks," Network World, IDG Communications, Inc., Jan. 2013, pp. 1-4.
Richard A. Compton, unpublished U.S. Appl. No. 15/880,522, filed Jan. 25, 2018, Distributed Denial-of-Service Attack Mitigation With Reduced Latency 25 pages 6 sheets drawings.

* cited by examiner

NETWORK SECURITY ATTACK DETECTION AND MITIGATION SOLUTION USING HONEYPOTS

FIELD OF THE INVENTION

The present invention relates generally to the electrical, electronic and computer arts, and, more particularly, to the detection and mitigation of distributed denial-of-service attacks.

BACKGROUND OF THE INVENTION

In the context of computing, a denial-of-service (DoS) attack is an attempt to make a machine or network resource unavailable to its intended users. A distributed denial-of-service (DDoS) attack is an attack in which multiple compromised computer systems attack a target resource, such as a server, router, firewall, website, or other network resource, and cause a denial of service for users of the targeted resource. A flood of incoming messages, connection requests, malformed packets, and the like creates a stream of "bogus" traffic which, when transmitted to the target system, forces it to slow down or even crash and shut down. Since a server or other network resource can only process a limited number of requests at any given time, if an attacker overloads the target resource with requests, it is unable to process the requests of its legitimate users, thereby resulting in a "denial of service" because the users are prevented from accessing that resource.

Two common types of DDoS attacks are bandwidth attacks and application attacks. Bandwidth attacks are DDoS attacks which consume resources such as network bandwidth or equipment by overwhelming one or the other (or both) with a high volume of packets. Targeted routers, servers, firewalls, and the like, all of which have limited processing capability, can be rendered unavailable to process valid transactions, and can fail under the load. One common form of bandwidth attack is a packet-flooding attack, in which a large number of seemingly legitimate Transmission Control Protocol (TCP), User Datagram Protocol (UDP), Internet Control Message Protocol (ICMP) and/or other protocol IP packets are directed to a target destination, thus filling up the available bandwidth to the target and preventing valid connections from being established. To make detection even more difficult, such attacks might also spoof the source address; that is, misrepresent the Internet Protocol (IP) source address that supposedly generated the request to prevent identification. In some instances, the address of the attack victim is maliciously utilized by the attacker, or spoofed. Application attacks, on the other hand, are DDoS attacks that use the expected behavior of protocols, such as, for example, TCP and Hypertext Transfer Protocol (HTTP), to an attacker's advantage by tying up computational resources and preventing them from processing transactions or requests. HTTP half-open and HTTP error attacks are common examples of application attacks.

Since DDoS attacks are by definition distributed, it can be very difficult to mitigate attack traffic when the attacking source IP addresses are so widespread. Furthermore, a growing trend among DDoS attackers is to use sophisticated spoofing techniques and essential protocols (rather than nonessential protocols that can be blocked) to make DDoS attacks even more stealthy and disruptive. These attacks, which use legitimate application protocols and services, are very difficult to identify and defeat; employing broad packet-filtering or rate-limiting measures simply completes the attacker's desired objective by shutting down the system, causing denial of service to legitimate users.

In one particular type of attack, a DNS query may be submitted by an attacker to an open DNS server. The attacker utilizes (or spoofs) the IP address of the victim in the DNS query. Responses from the DNS server to the DNS query typically include a large number of packets due to the amount of data in a typical query response. Thus, the DDoS attack effectively amplifies the traffic generated by the attacker. Since the packets of the query response are directed to the victim due to the spoofed IP address, the computing and network resources of the attack victim can be overwhelmed, leading to a denial of service for users of these resources.

SUMMARY OF THE INVENTION

Principles of the invention provide a detection and mitigation solution for a distributed denial-of-service attack using honeypots. In one aspect, an exemplary method includes receiving a data packet at a DDoS honeypot from a network; determining a source address of the data packet; and initiating a mitigation action based on the source address and one or more mitigation rules, wherein a determination of whether the received data packet is part of a DDoS attack is based on one or more detection rules.

In another aspect, an exemplary system for mitigating a distributed denial-of-service attack in a networked computing system comprises: at least one DDoS honeypot in operative communication with a central controller in the networked computing system, wherein: the at least one DDoS honeypot is configured to receive a data packet from a network, determine a source address of the data packet, and send the source address to the central controller; and the central controller is configured to initiate a mitigation action based on the source address and one or more mitigation rules, wherein a determination of whether the received data packet is part of the DDoS attack is based on one or more detection rules.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a DDoS honeypot, an Internet Service Provider (ISP) peering router, data center, DDoS mitigation device, and the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

- enhanced accuracy of information regarding the destination of a suspected DDoS attack to provide more targeted DDoS mitigation options;
- targeted DDoS detection technique that mitigates attack traffic flow;
- targeted DDoS mitigation actions based on at least the source of the detected malicious traffic for alleviating DDoS attacks without adversely impacting the flow of valid traffic in the system;
- faster detection due to the interpretation of an access of a honeypot as an indicator of a malicious attack (other DDoS detection methods typically require the DDoS traffic to exceed a certain significant volume which will disable the victim before a positive detection and then application of a mitigation; some embodiments do require the traffic to exceed a smaller volume to avoid false alarms from scanning); and
- implementation of the novel DDoS detection and mitigation techniques can be easily integrated with existing system hardware, thereby providing a more robust DDoS detection and mitigation mechanism without significantly increasing system overhead and complexity.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

Figure 1:
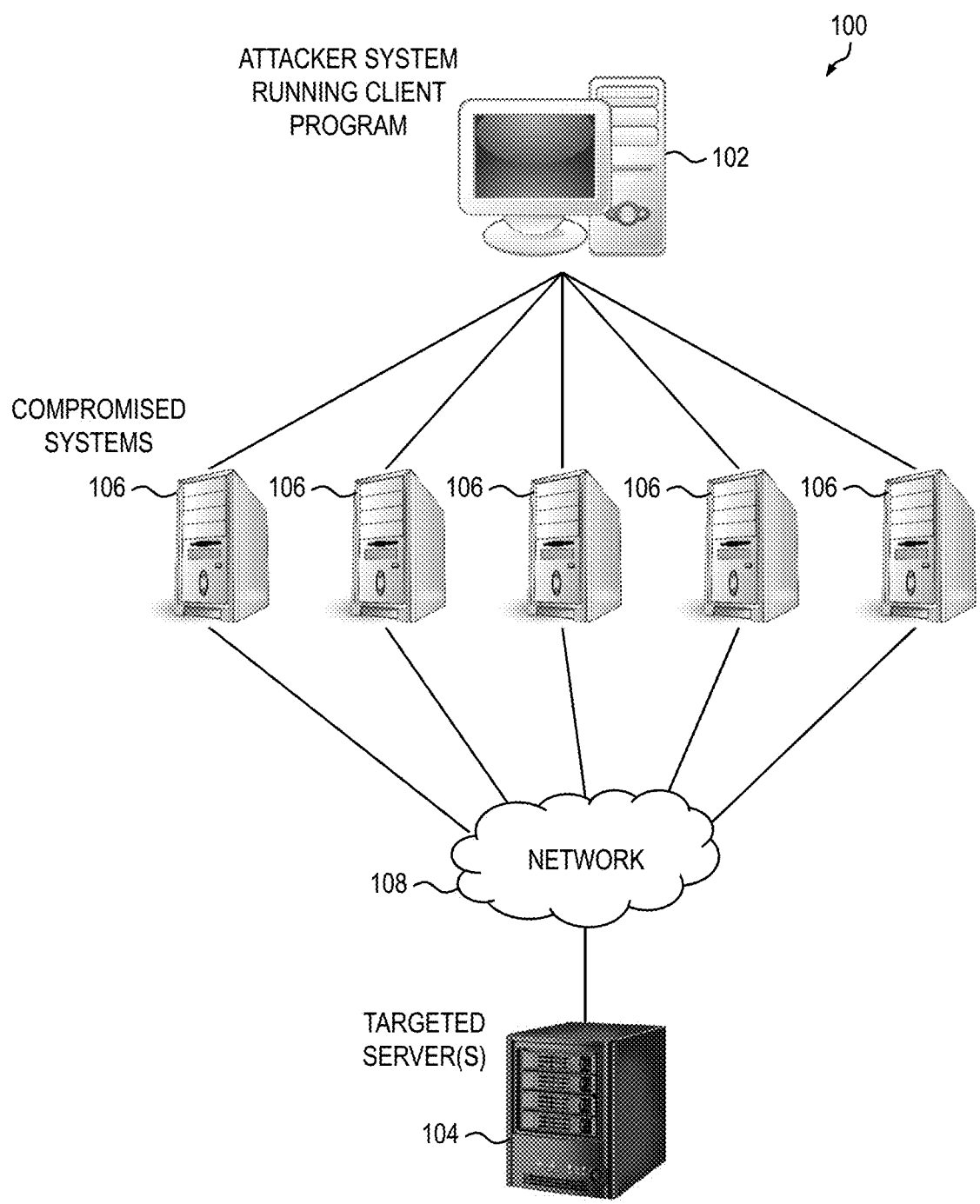
FIG. 1 is a block diagram conceptually depicting the occurrence of a DDoS attack in an exemplary networked computing system.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present disclosure will be described herein in the context of apparatus and methods for detecting and mitigating distributed denial-of-service (DDoS) attacks in a networked computing environment. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

One or more embodiments provide a method of detecting and mitigating distributed denial-of-service (DDoS) attack network traffic. In one or more embodiments, a number of DDoS honeypots are deployed. Each DDoS honeypot simulates a host that is running a service that can be used for a DDoS attack, such as an attack using amplification of network traffic (such as DNS, NTP, Chargen, Memcache, and the like), but the honeypot will refrain from sending out large volumes of attack traffic in response to the attack, as would conventionally be done by a host. In one or more embodiments, each honeypot logs the incoming network traffic and sends the network traffic logs to a centralized controller. The network log may contain only the source address of the network traffic (such as a source IP address), or may contain additional information. The additional information may include, for example, application layer information from the payload of the packet indicating, for example, the type of query that is being requested. The central controller extracts, for example, the source address of the network traffic (from the network traffic log) that is being targeted by the attack traffic and generates one or more rules to mitigate the attack, for example, to block the attack traffic. For example, if the central controller is aware of the type of query being requested, the central controller can generate a rule that activates a specific type of filter for the specified type of query. The mitigation action specified by the rules are then implemented by, for example, various network devices. Once the honeypots no longer detect the attack traffic, the central controller will then instruct the network devices to remove the mitigation action, such as to remove the block of the attack traffic.

As previously stated, DDoS attacks are by definition distributed, and therefore it can be very difficult to accurately detect and mitigate attack traffic when the attacking source IP addresses are so widespread. Furthermore, a growing trend among DDoS attackers is to utilize sophisticated spoofing techniques and essential protocols to make DDoS attacks even more stealthy and disruptive. These attacks, which use legitimate application protocols and services, are very difficult to identify and defeat.

FIG. 1 is a block diagram conceptually depicting the occurrence of a DDoS attack in an example networked computing system 100. In a typical DDoS attack, an attacker system 102 running a client program seeks to make a targeted system 104, often one or more Web servers, unavailable to its intended users. Denial of service is typically accomplished by the attacker system 102 flooding the targeted system 104 with superfluous requests or other malicious traffic via multiple compromised computer systems 106 connected with the targeted system in a distributed manner through a network 108, such as the Internet. The incoming traffic flooding the targeted system 104 in a DDoS attack originates from many different sources (e.g., compromised systems 106), thereby making it effectively impossible to stop the attack simply by blocking a single source.

The terms "network traffic," or "data traffic," or simply "traffic" as used herein are intended to broadly refer to the amount of data moving across a network at a given point in time. From a computing standpoint, network data in computer networks is most typically encapsulated in data packets, which provide the load in the network.

Currently, detection of DDoS attacks is based on the volume of traffic and not the source of the traffic. For example, a standard DDoS detection scheme may involve inspecting the volume of data packets sent to a certain customer from all sources under "normal" conditions to establish a baseline traffic level, and if there is a large increase in the volume of traffic compared to the established baseline level, a DDoS attack is suspected. Various parameters may be used to determine whether a threshold level of traffic has been exceeded, such as, but not limited to, evaluating total User Datagram Protocol (UDP) traffic, total Domain Name System (DNS) traffic, various protocols commonly used for DDoS attacks, and the like.

When the volume of detected traffic exceeds some threshold, either a prescribed value or based on one or more algorithms or software, some action is taken which may be in the form of, for instance, triggering an alert or blocking what is believed to be the attacking traffic. Current DDoS attack mitigation may involve, for example, broad packet-filtering, throttling or rate-limiting the traffic to alleviate what is presumed to be a DDoS attack, when in reality the traffic may be attributable to valid users. Employing these measures, however, simply facilitates the attacker's desired objective by shutting down the system, causing denial of service to legitimate users.

Embodiments of the invention, according to aspects thereof, beneficially provide apparatus and/or methods for detecting and mitigating the threat of DDoS attacks by using, at least in part, a honeypot for luring the source of a malicious attack. In one or more embodiments, a number of DDoS honeypots are deployed. Each DDoS honeypot simulates a host that is running a service that can be used by an attacker for DDoS amplification (such as DNS, NTP, Chargen, Memcache, and the like), but the honeypot refrains from sending out large volumes of attack traffic, as would conventionally be done by a host. Since the DDoS honeypot is not advertised and is generally unknown to clients and users, any client that attempts to access the honeypot server by, for example, submitting a DNS query to the honeypot is assumed to be a potential attacker.

In one or more embodiments, each DDoS honeypot logs the incoming network traffic and sends the network traffic logs to a central controller. As described above, the network log may contain only the source address of the network traffic (such as a source IP address), or may contain additional information. The DDoS honeypot obtains the source address of the network traffic (which is typically the source IP address of the attack victim) and sends it to the central controller. The central controller monitors the network traffic logs and makes a decision as to whether the traffic is part of an attack based on one or more detection rules. (In one example embodiment, the DDoS honeypot makes a decision as to whether the traffic is part of an attack based on one or more detection rules and informs the central controller of the decision). In one example embodiment, any submission to a DDoS honeypot is assumed to be an attack. In one example embodiment, a particular pattern of network traffic, such as a continuous stream of DNS queries, is assumed to be an attack.

In response to a detection of an attack, the central controller extracts, for example, the IP address of the victim that is being targeted by the attack traffic and generates one or more mitigation rules to mitigate the attack. For example, a mitigation rule may indicate that the attack traffic should be blocked. The mitigation rules are then sent to and implemented by various network devices to implement the mitigation action (for example, to block the attack traffic). The DDoS honeypots continue to monitor the network traffic and report to the central controller. Once the DDoS honeypots no longer detect the attack traffic, the central controller instructs the network devices to remove the mitigation action, such as to remove the block on the attack traffic.

In one or more embodiments, the honeypots are used in conjunction with at least one other criteria, such as, for example, the volume of traffic, a weighting or whitelisting (i.e., a listing or registering of entities that are being provided a particular privilege, service, mobility, access or recognition), and the like. The volume of network traffic can be used as another indicator of a malicious attack for the DDoS honeypot. In one or more embodiments, the source IP of the traffic coming into the DDoS honeypot(s) is the IP of the victim, so the source could very well be a famous source that one might think would be trustworthy.

Figure 2:
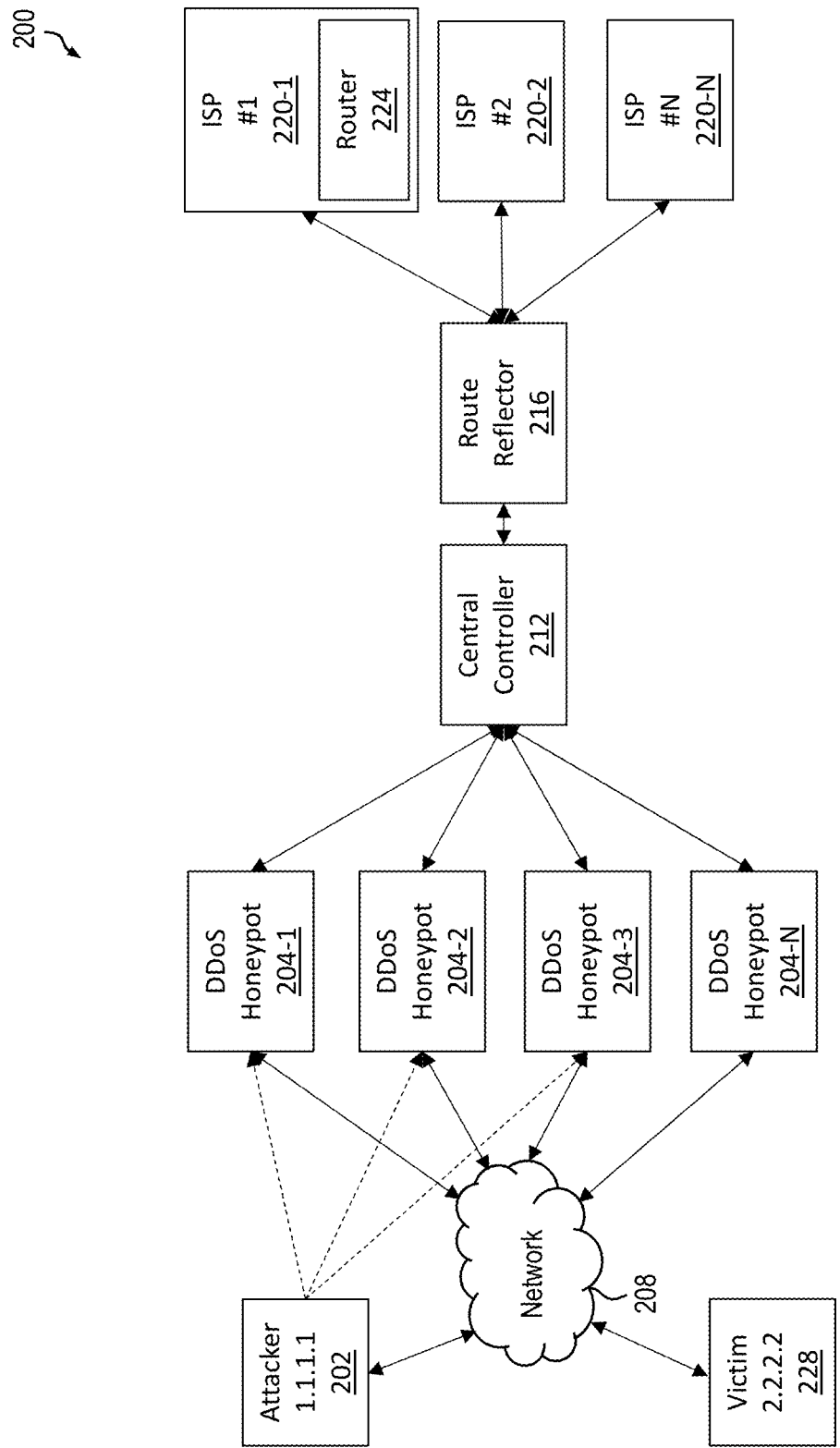
FIG. 2 is a block diagram depicting at least a portion of an exemplary system for detecting and mitigating DDoS attacks in a networked computing system, according to an embodiment of the invention.

FIG. 2 is a block diagram depicting at least a portion of an exemplary system 200 for detecting and mitigating DDoS attacks in a networked computing system, according to an embodiment of the invention. As shown in FIG. 2, the DDoS detection and mitigation system 200 includes one or more DDoS honeypots 204-1, 204-2, 204-3 . . . 204-N (known collectively as DDoS honeypots 204 herein) operatively coupled with a network 208 (e.g., the Internet), a central controller 212 operatively coupled with the DDoS honeypots 204 and a route reflector 216, and one or more sub-networks 220-1, 220-2, 220-3 . . . 220-N (known collectively as sub-networks 220 herein) operatively coupled with the route reflector 216. In one example embodiment, the central controller 212 is integrated into one of the DDoS honeypots 204. "N" is generally used to signify an arbitrary number, and the number of honeypots can be the same or different than the number of sub-networks. Elements can be "operatively coupled," for example, by wired and/or wireless networking and/or internetworking. In one example embodiment, the DDoS honeypots 204 are geographically distributed to reduce the likelihood that many or all of the DDoS honeypots 204 are discovered by an attacker.

The sub-networks 220 may be, for example, the network of an internet service provider, a data center, and the like. Each sub-network 220 may comprise one or more routers 224 that are configured to receive requests or other traffic from the network with which the router is operatively coupled (e.g., in wired or wireless communication therewith). In one or more embodiments, the router is configured to characterize network operation by collecting IP network traffic flow information as the traffic enters or exits an interface or network node, such as, for example, using NetFlow (a product of Cisco Systems, Inc.) or the like. By analyzing the data provided by NetFlow, a network administrator can determine information relating to the operational status of the network, such as, but not limited to, the source and destination of traffic, class of service, and the causes of congestion. In order to characterize network operation, the router, in one or more embodiments, is configured to aggregate packets into flows and to export flow records, to receive, store and pre-process the flow records, and to analyze the received flow data in the context of intrusion detection and/or traffic profiling, for example. At least a subset of the network traffic flow information may be passed to the central controller 212 where the traffic flow may also be monitored for the presence of a possible DDoS attack condition.

As noted above, each DDoS honeypot 204 logs the incoming network traffic and sends the network traffic logs, including any spoofed IP addresses, to the central controller 212. The central controller 212 analyzes the network traffic logs using, for example, one or more detection rules and makes a decision as to whether the traffic is part of an attack. In one example embodiment, any network traffic to a DDoS honeypot 204 is assumed to be a malicious attack. In one example embodiment, a particular pattern of traffic, such as a spike in traffic, a continuous stream of traffic (such as a continuous stream of DNS queries), and the like is assumed to be a malicious attack. If an attack is determined to be underway, the central controller 212 obtains the IP address of the victim that is being targeted by the attack traffic (such as from the network traffic logs received from the DDoS honeypot 204) and generates one or more mitigation rules to mitigate the attack traffic. For example, a mitigation rule may specify that network traffic having a source address that matches the IP address of the victim be blocked. The mitigation rules are sent to the route reflector 216 which determines the network devices, such as routers and the like, of the sub-networks 220 that will implement the mitigation rules. The route reflector 216 then forwards the mitigation rules to the identified network devices. In one example embodiment, the central controller 212 sends a message or other control signal to the network device instructing the network device to handle all traffic from a specified IP address differently from the normal IP traffic, including, but not limited to, blocking or discarding packets from the attack traffic (either randomly or in some defined manner), rate-limiting the traffic, diverting the traffic to a different path (e.g., by changing the target IP address) for performing deep packet inspection (DPI) or another analysis mechanism on all or a subset of the packets constituting the malicious traffic flow, and the like. In this manner, traffic originating from the flagged IP source is disrupted while traffic originating from trusted IP sources is allowed to pass, thereby eliminating the DDoS attack without impacting legitimate users.

Once the DDoS honeypots 204 no longer detect the attack traffic, the central controller 212 instructs the network devices to remove the mitigation action, such as remove the block of the attack traffic.

In detecting the presence of a potential DDoS attack, the central controller 212 in cooperation with the DDoS honeypots 204, in one or more embodiments, is configured to monitor the volume of packets received from an attacker 202. As described above, any large volume of network traffic to a DDoS honeypot 204 may be assumed to be an attack or a particular pattern of network traffic to a DDoS honeypot 204 may be assumed to be an attack (a small bit of network traffic might be mere scanning). In the former case, the central controller 212 may utilize one or more thresholds, which may be stored either internally or may reside externally to the central controller 212. The thresholds may be based on a prescribed value, on one or more algorithms or software (e.g., modeling a behavior and/or operational status of the network), or some combination thereof, according to one or more embodiments; the thresholds may be fixed or dynamic. Various parameters may be used to determine whether a threshold level of traffic has been exceeded, including, but not limited to, evaluating total UDP traffic, total DNS traffic, various protocols commonly used for DDoS attacks, and the like.

In one example embodiment, the decision of whether a submission is treated as an attack is based on a received traffic volume originating from a potentially malicious source (such as a spike in traffic volume) and prescribed threat information. The threat information preferably comprises a risk level or weighting of risk. This weighting is used to determine a probability that the incoming traffic is originating from a malicious IP source. In one or more embodiments, the threat information may be in the form of a whitelist of valid ASNs, a blacklist of malicious ASNs, and the like. Preferably, the threat information is updated periodically, for example, automatically based on historical data or manually by a user, so that the threat information is kept current to adapt to changing threats. It is to be appreciated that embodiments of the invention are not limited to any specific form(s) of the threat information in evaluating whether the spike in traffic flow is attributable to a malicious IP source.

The network devices of the sub-networks 220 that implement the mitigation rules may be "peering" routers. In a typical scenario, the attack systems 202 operate in a distributed manner to flood (and thereby overwhelm) a targeted victim system 228 with superfluous requests or other malicious traffic through the network 208, such as the Internet. The superfluous traffic may be channeled through a router 224, which may be an Internet Service Provider (ISP) peering router or the like. The term "peering" as used herein is intended to refer broadly to an arrangement of traffic exchange between two or more ISPs; larger ISPs (e.g., the Internet) with their own backbone networks that agree to allow traffic from other large ISPs in exchange for traffic on their backbones. They also exchange traffic with smaller ISPs, such as, for example, ISP network (such as sub-network 220), so that they can reach regional end points.

Peering requires the exchange and updating of router information between the peered ISPs, typically using Border Gateway Protocol (BGP) or another suitable communication protocol. Generally, peering parties interconnect at network focal points, such as, for example, network access points (NAPs) in the United States and at regional switching points. Each major ISP generally develops a peering policy that states the terms and conditions under which it will peer with other networks for various types of traffic.

As illustrated in FIG. 2, the peering router 224 is in operative communication with the ISP network (such as sub-network 220). The peering router 224, in one or more embodiments, is configured to control traffic between the Internet 208 and the ISP network (such as sub-network 220), generally via one or more BGP sessions (or suitable alternative communications protocols) established between the router and the Internet 208 and/or ISP network (such as sub-network 220).

The peering router 224 is operatively coupled with the central controller 212; at least portions of the central controller 212, in one or more embodiments, are incorporated within at least one data center (e.g., a national data center (NDC) and/or a regional data center (RDC)) in communication with the peering router 224.

The peering router 224 may include a first mitigation device (not shown) which is adapted to receive the output message from the central controller 212 and to perform one or more actions in response thereto for mitigating a DDoS attack. The mitigation device may be a separate device or an application or module running on the peering router 224 itself. DDoS mitigation actions which may be performed by the mitigation device may include, but are not limited to, rate-limiting the traffic, discarding packets from the traffic (either randomly or in some defined manner), performing DPI on all or a subset of the packets constituting the malicious traffic flow, and the like.

Still referring to FIG. 2, the most common type of DDoS attack is where an attacker uses other computers/devices on the Internet to amplify the traffic. For example, the attacker 202 has true IP address 1.1.1.1 but spoofs the IP address 2.2.2.2 of the victim 228. The attack traffic will them come into hosts that are vulnerable to amplification; e.g., open DNS servers on the Internet that have been incorrectly set up. A small DNS query may ask for all entries for google.com; the DNS server will then reply with a much larger response including search.google.com, mail.google.com . . . . Multiple packets are then sent back to the victim 228 because the attacker 202 spoofed the source IP of the victim. The attacker picks out a DNS query which is a small query but results in a large reply with multiple packets, to amplify the attack. If the query is then sent to a large number of open DNS servers, a large number of packets will be directed back to the victim 228. The DDoS honeypots appear to the attacker to be exploitable to carry out the traffic amplification, but in fact, the honeypots do not do this. In one or more embodiments, the honeypots determine the true victim IP address and type of attack and feed this information to the central controller 212. Controller 212 then creates a rule to block attack traffic to address 2.2.2.2; this is sent to the route reflector 216 which then sends the rules to all of the different routers 224 of the ISPs 220, which block the attack traffic directed to victim 228. In some embodiments, the honeypots are not advertised and are only discovered when attackers are scanning the Internet for open services; any traffic to the honeypots is the suspect. In some cases, when continuous queries (e.g. thousands of requests per second to the same DNS server) are noted, it is assumed that there is an attack under way; an ordinary number of requests is not considered as suspicious. In a non-limiting example, the honeypots are within the network of an ISP such as a broadband provider; the central controller resides in a datacenter; the route reflector resides in a data center or is connected to a backbone network; and the ISPs 220 are individual peering routers within the broadband provider's network and/or in the network(s) of other ISP(s). The skilled artisan will appreciate that peering routers provide connections to other ISPs/networks; for example, in a co-location facility. In one or more embodiments, DDoS honeypots 204 are employed to dynamically generate mitigations for the DDoS attack (e.g., actively block).

Figure 3A:
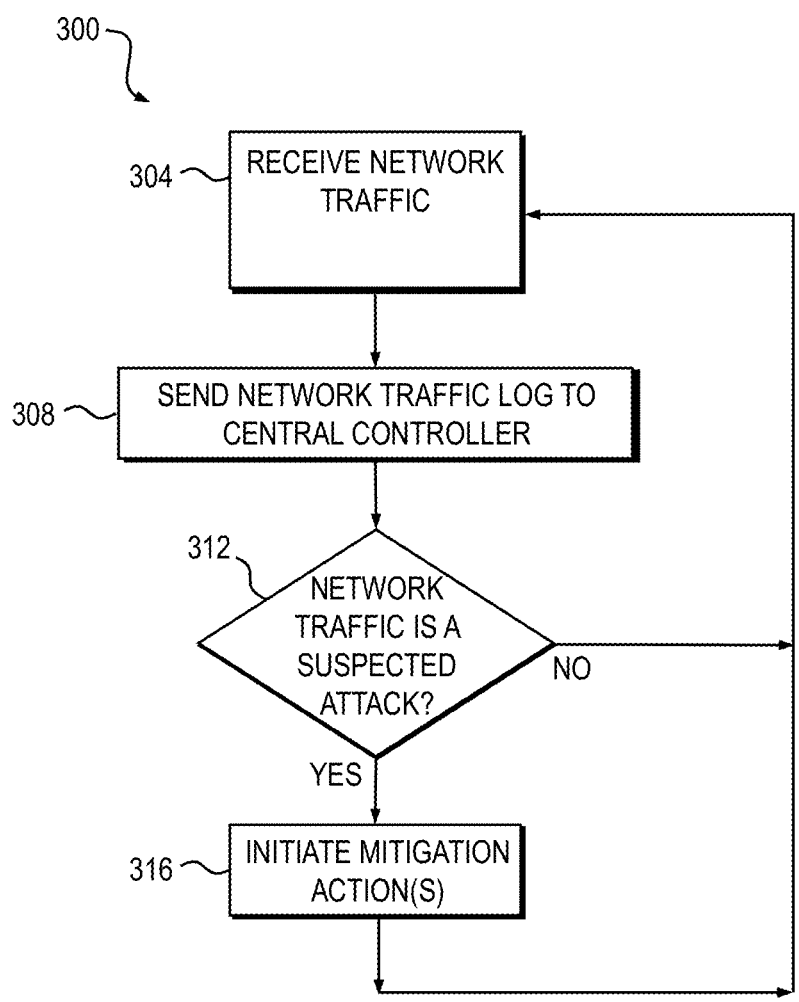
FIG. 3A is a flow diagram depicting a first example method for detecting and mitigating DDoS attacks, according to an embodiment of the invention.

FIG. 3A is a flow diagram depicting a first example method 300 for detecting and mitigating DDoS attacks, according to an embodiment of the invention. In one example embodiment, at least a portion of the DDoS detection flow of the method 300 is preferably implemented in the DDoS honeypots 204, and at least a portion of the DDoS mitigation flow of the method is preferably implemented in the central controller 212. In one example embodiment, operations 312 and 316 are performed by the central controller 212.

With continued reference to FIG. 3A, in accordance with the method 300, the DDoS honeypot 204 receives network traffic from an attacker in step 304. In step 308, the DDoS honeypot 204 sends the source address of the network traffic, such as a source IP address, to the central controller 212. The source address may be sent as part of a network log with additional information, such as an indication of the amount of traffic received from the cited source address. The central controller 212 then determines whether the network traffic is part of a suspected attack in step 312. In one example embodiment, the central controller 212 determines that any network traffic received by the DDoS honeypot 204 is a suspected attack. In one example embodiment, the central controller 212 determines that the network traffic is a suspected attack based on one or more detection rules. A rule may indicate that the network traffic is a suspected attack based a pattern of the network traffic, such as whether the network traffic exhibits a spike in volume, is a continuous stream, and the like.

In one example embodiment, the central controller 212 determines that the network traffic is a suspected attack if a rate of the network traffic exceeds a predefined threshold, such as an established baseline normal traffic level of, for example, 5 packets per second. This threshold information, or a portion thereof, may be obtained from a source external to the DDoS honeypot 204 and central controller 212 (e.g., external database, software module running a dynamic threshold calculation application, and the like) or at least a portion of the threshold information may be stored within the DDoS honeypot 204 and/or central controller 212 (e.g., historical baseline normal traffic level). The volume of traffic received by the DDoS honeypot 204 may be compared with threshold information (e.g., using a comparator or other comparison mechanism) to determine whether or not the volume of traffic flow exceeds the defined threshold. When the volume of traffic does not exceed the level defined by the threshold information and the network traffic does not otherwise satisfy a rule indicating that an attack is underway, the central controller 212 determines that the network traffic is not a suspected attack and the method 300 continues with step 304. When the volume of traffic exceeds the level defined by the threshold information or the network traffic otherwise satisfies a rule indicating that an attack is underway, the central controller 212 determines that the network traffic is a suspected attack and the method 300 proceeds with step 316. Given the teachings herein, the skilled artisan will be able to select a suitable threshold based on the application.

In step 316, the central controller 212 initiates one or more attack mitigation actions. Such actions may comprise, for example, rate-limiting the traffic from the flagged source address, discarding packets from the flagged source address, diverting traffic flow to a specified network address, performing DPI on the traffic flow, and the like, as previously described. For example, the central controller 212 may send a message or other control signal to a network device of a sub-network 220 instructing the network device to handle all traffic from a specified network address differently from the normal network traffic. Prescribed mitigation actions may be stored in a database, table, whitelist, and the like. In this manner, the mitigation action performed can be tailored to the corresponding source address.

In one example embodiment, the central controller, in cooperation with the DDoS honeypot 204, detects a cessation of the malicious attack and directs that appropriate network devices to undo the mitigation action(s), such as remove the block of the attack network traffic.

Figure 3B:
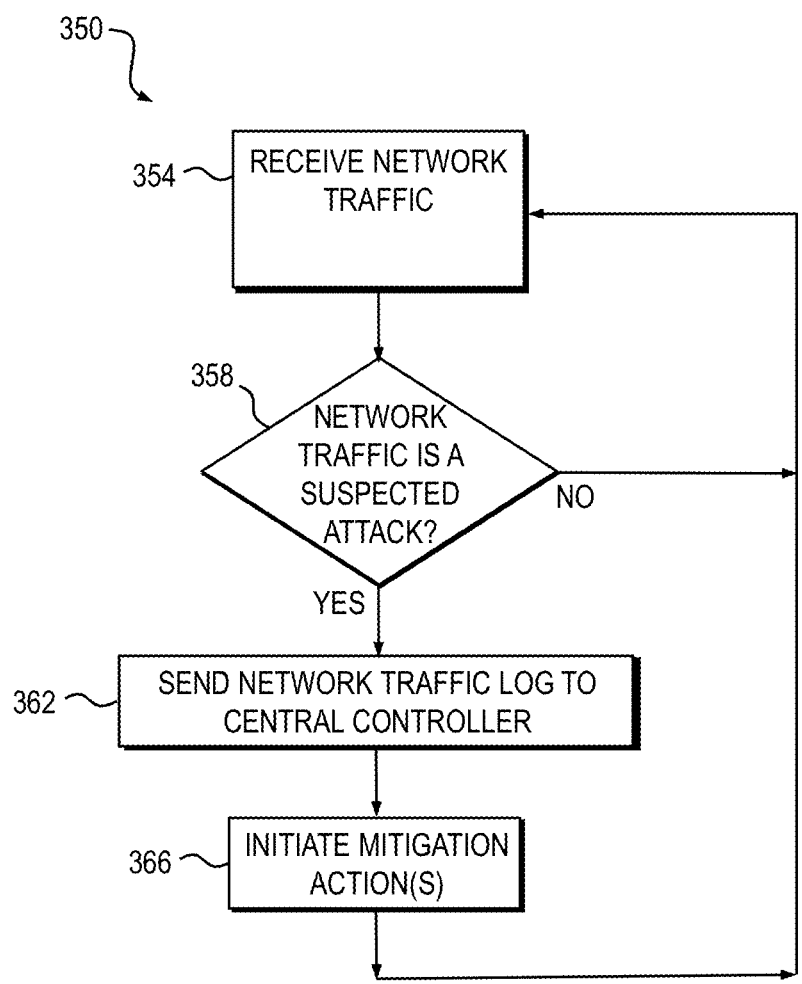
FIG. 3B is a flow diagram depicting a second example method for detecting and mitigating DDoS attacks, according to an embodiment of the invention.

FIG. 3B is a flow diagram depicting a second example method 350 for detecting and mitigating DDoS attacks, according to an embodiment of the invention. In one example embodiment, at least a portion of the DDoS detection flow of the method 300 is preferably implemented in the DDoS honeypots 204, and at least a portion of the DDoS mitigation flow of the method is preferably implemented in the central controller 212. In one example embodiment, operations 362 and 366 are performed by the central controller 212. It is worth noting that, since the centralized controller obtains input from all the different honeypots in one or more embodiments, the centralized controller has more information on which to base a determination of whether a putative attack is an actual attack, and then to generate a rule to block the attack traffic.

With continued reference to FIG. 3B, in accordance with the method 350, the DDoS honeypot 204 receives network traffic from a suspected attacker in step 354. In step 358, the DDoS honeypot 204 determines whether the network traffic is a suspected attack based on whether one or more detection rules are satisfied. In one example embodiment, the DDoS honeypot 204 determines that any network traffic received by the DDoS honeypot 204 is a suspected attack. In one example embodiment, a detection rule indicates that the network traffic is a suspected attack based a pattern of the network traffic, such as whether the network traffic exhibits a spike in volume, is a continuous stream, and the like.

In one example embodiment, the DDoS honeypot 204 determines that the network traffic is part of a suspected attack if a rate of the IP traffic exceeds a predefined threshold, such as an established baseline normal traffic level of, for example, 5 packets per second. As described above, this threshold information, or a portion thereof, may be obtained from a source external to the DDoS honeypot 204 (e.g., external database, software module running a dynamic threshold calculation application, etc.) or at least a portion of the threshold information may be stored within the DDoS honeypot 204 itself (e.g., historical baseline normal traffic level). In the latter case, the volume of traffic received by the DDoS honeypot 204 is compared with threshold information (e.g., using a comparator or other comparison mechanism) to determine whether or not the volume of traffic flow exceeds the defined threshold. When the volume of traffic does not exceed the level defined by the threshold information and the network traffic does not otherwise satisfy a detection rule indicating that an attack is underway, the DDoS honeypot 204 determines that the network traffic is not a suspected attack and the method 350 continues with step 354. When the volume of traffic exceeds the level defined by the threshold information or the network traffic otherwise satisfies a detection rule indicating that an attack is underway, the DDoS honeypot 204 determines that the network traffic is a suspected attack and the method 350 proceeds with step 362. In step 362, the DDoS honeypot 204 sends the source address of the network traffic to the central controller 212.

In step 366, the central controller 212 initiates one or more mitigation actions. Such actions may comprise, for example, rate-limiting the traffic from the flagged source network address, discarding packets from the flagged source network address, diverting traffic flow to a specified network address, performing DPI on the traffic flow, and the like, as previously described. For example, the central controller 212 may send a message or other control signal to a network device of a sub-network 220 instructing the network device to handle all traffic from a specified network address differently from the normal network traffic. Prescribed mitigation actions may be stored in a database, table, whitelist, and the like.

In one example embodiment, the central controller, in cooperation with the DDoS honeypot 204, detects a cessation of the malicious attack and directs that appropriate network devices to undo the mitigation action(s), such as remove the block of the attack network traffic.

Recapitulation

In another aspect, an exemplary system for mitigating a distributed denial-of-service attack in a networked computing system comprises at least one DDoS honeypot in operative communication with a central controller in the networked computing system, wherein the at least one DDoS honeypot is configured to receive a data packet from a network, determine a source address of the data packet, and send the source address to the central controller; and the central controller is configured to initiate a mitigation action based on the source address and one or more mitigation rules, wherein a determination of whether the received data packet is part of the DDoS attack is based on one or more detection rules. In one example embodiment, the DDoS honeypot performs the determination of whether the received data packet is part of the DDoS attack. In one example embodiment, the central controller performs the determination of whether the received data packet is part of the DDoS attack.

In one example embodiment, one of the one or more detection rules indicates that any data packet received by the DDoS honeypot is part of the DDoS attack. In one example embodiment, one of the one or more detection rules indicates that any data packet received by the DDoS honeypot that satisfies a specified data pattern is part of the DDoS attack. In one example embodiment, one of the one or more detection rules indicates that any data packet received by the DDoS honeypot that is a part of network traffic having a volume that exceeds a specified threshold rate is part of the DDoS attack. In one example embodiment, one of the one or more mitigation rules indicates that network traffic from the flagged source address is to be rate limited. In one example embodiment, one of the one or more mitigation rules indicates that network traffic from the flagged source address is to be blocked, discarded, or both. In one example embodiment, one of the one or more mitigation rules indicates that network traffic from the flagged source address is to be diverted to a specified network address. In one example embodiment, one of the one or more mitigation rules indicates that DPI is to be performed on the network traffic from the flagged source address.

In one example embodiment, the central controller is a component of the DDoS honeypot. In one example embodiment, the central controller is further configured to send at least one of the mitigation rules to at least one network device. In one example embodiment, the at least one network device is part of an internet service provider's infrastructure, a hosting provider's infrastructure, or an enterprise's infrastructure. In one example embodiment, the central controller is further configured to initiate a cancellation of the mitigation action in response to a cessation of the DDoS attack. In one example embodiment, the at least one DDoS honeypot is configured to send to the central controller application layer information from a payload of the data packet indicating a type of query that is being requested.

In one example embodiment, a method comprises: receiving a data packet at a DDoS honeypot from a network; determining a source address of the data packet; and initiating a mitigation action based on the source address and one or more mitigation rules, wherein a determination of whether the received data packet is part of a DDoS attack is based on one or more detection rules. In one example embodiment, a non-transitory persistent storage medium contains instructions which, when loaded into a memory, configure at least one processor to perform operations comprising: receiving a data packet at a DDoS honeypot from a network; determining a source address of the data packet; and initiating a mitigation action based on the source address and one or more mitigation rules, wherein a determination of whether the received data packet is part of a DDoS attack is based on one or more detection rules.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 4:
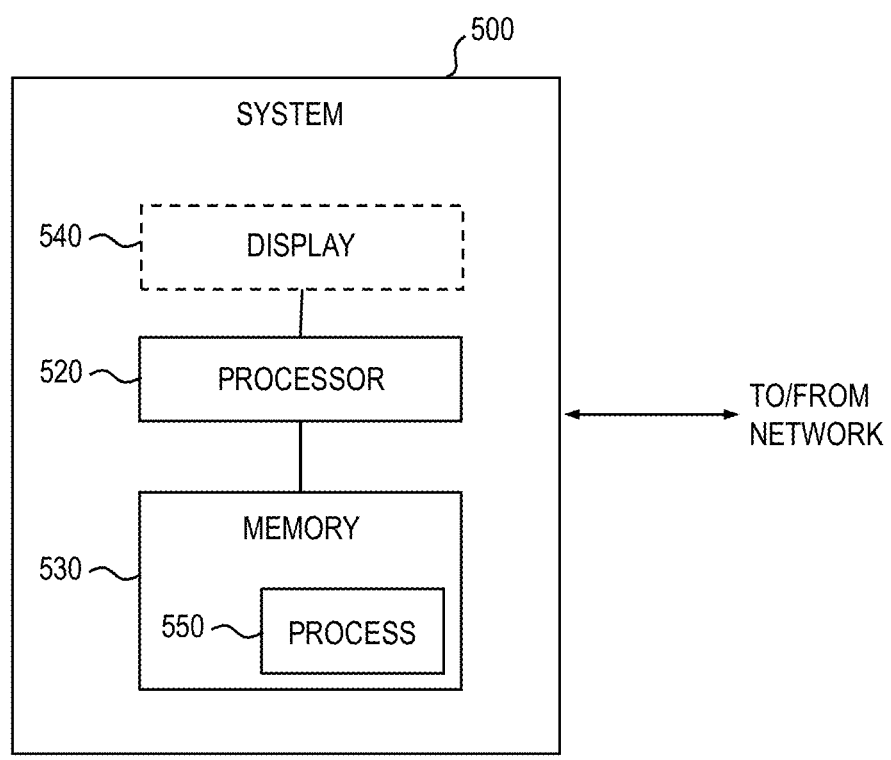
FIG. 4 is a block diagram of at least a portion of an exemplary system that can be configured to implement at least some aspects of the invention, according to one or more embodiments of the present invention.

FIG. 4 is a block diagram of at least a portion of an exemplary system 500 that can be configured to implement at least some aspects of the invention, and is representative, for example, of one or more of the apparatus or modules shown in the figures. As shown in FIG. 4, memory 530 configures the processor 520 to implement one or more methods, steps, and functions (collectively, shown as process 550 in FIG. 4). The memory 530 could be distributed or local and the processor 520 could be distributed or singular. Different steps could be carried out by different processors, either concurrently (i.e., in parallel) or sequentially (i.e., in series).

The memory 530 could be implemented as an electrical, magnetic or optical memory, or any combination of these or other types of storage devices. It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an ASIC rather than using firmware. Display 540 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system for mitigating a distributed denial-of-service (DDoS) attack in a networked computing system, the system comprising:
   a central controller;
   a plurality of DDoS honeypots, implemented using a first computer system, in operative communication via a network with the central controller, implemented using a second computer system, in the networked computing system, wherein:
   the plurality of DDoS honeypots are configured to impersonate a legitimate network-based device, receive one or more data packets from the network, determine a source address of at least one of the data packets, refrain from performing at least one action expected by a source of the data packet in response to a determination that the one or more received data packets are part of the DDoS attack, the refraining from performing the at least one action comprising refraining from sending traffic to the source in response to at least one request, determine whether the one or more received data packets are part of the DDoS attack, and send a network traffic log to the central controller in response to at least one of the DDoS honeypots determining that the one or more received data packets are part of the DDoS attack, the network traffic log comprising the source address and additional information for at least a plurality of the data packets; and
   the central controller is configured to analyze network traffic logs from the plurality of DDoS honeypots and to initiate a mitigation action for any of a plurality of network devices based on the network traffic logs and one or more mitigation rules, wherein the determination of whether the received data packet is part of the DDoS attack is based on one or more detection rules.

2. The system of claim 1, wherein the central controller performs an additional determination of whether the one or more received data packets are part of the DDoS attack.

3. The system of claim 1, wherein one of the one or more detection rules indicates that any data packet received by a given one of the DDoS honeypots is part of the DDoS attack.

4. The system of claim 1, wherein one of the one or more detection rules indicates that any data packet received by a given one of the DDoS honeypots that satisfies a specified data pattern is part of the DDoS attack.

5. The system of claim 1, wherein one of the one or more detection rules indicates that any data packet received by a given one of the DDoS honeypots that is a part of network traffic having a volume that exceeds a specified threshold rate is part of the DDoS attack.

6. The system of claim 1, wherein one of the one or more mitigation rules indicates that network traffic from the determined source address is to be rate limited.

7. The system of claim 1, wherein one of the one or more mitigation rules indicates that network traffic from the determined source address is to be blocked, discarded, or both.

8. The system of claim 1, wherein one of the one or more mitigation rules indicates that network traffic from the determined source address is to be diverted to a specified network address.

9. The system of claim 1, wherein one of the one or more mitigation rules indicates that deep packet inspection (DPI) is to be performed on the network traffic from the determined source address.

10. The system of claim 1, wherein the central controller is further configured to send at least one of the mitigation rules to at least one of the network devices.

11. The system of claim 10, wherein the at least one of the network devices is part of an internet service provider's infrastructure, a hosting provider's infrastructure, or an enterprise's infrastructure.

12. The system of claim 1, wherein the central controller is further configured to initiate a cancellation of the mitigation action in response to a cessation of the DDoS attack.

13. The system of claim 1, wherein at least one of the DDoS honeypots is configured to further send to the central controller only a portion of at least one of the data packets, the portion being application layer information from a payload of the at least one of the data packets indicating a type of query that is being requested.

14. A method comprising:
   impersonating a legitimate network-based device;
   receiving one or more data packets at a DDoS honeypot of a plurality of DDoS honeypots from a network;
   determining whether the one or more received data packets are a part of a DDoS attack;
   determining a source address of at least one of the data packets corresponding to the DDoS attack;
   refraining from performing at least one action expected by a source of the data packet in response to the determination that the one or more received data packets are part of the DDoS attack, the refraining from performing the at least one action comprising refraining from sending traffic to the source in response to at least one request;
   sending a network traffic log to a central controller in response to the DDoS honeypot determining that the one or more received data packets are part of the DDoS attack, the network traffic log comprising the source address and additional information for at least a plurality of the data packets, the central controller being configured to analyze network traffic logs from the plurality of honeypots and to initiate a mitigation action for any of a plurality of network devices; and
   initiating the mitigation action based on the network traffic log and one or more mitigation rules, wherein the determination of whether the received data packet is part of the DDoS attack is based on one or more detection rules.

15. The method of claim 14, wherein one of the one or more detection rules indicates that any data packet received by at least one of the DDoS honeypots that satisfies a specified data pattern is part of the DDoS attack.

16. The method of claim 14, wherein one of the one or more detection rules indicates that any data packet received by at least one of the DDoS honeypots that is a part of network traffic having a volume that exceeds a specified threshold rate is part of the DDoS attack.

17. The method of claim 14, wherein one of the one or more mitigation rules indicates that network traffic from the determined source address is to be blocked, discarded, or both.

18. A non-transitory computer readable medium comprising computer executable instructions which when executed by a processor cause the processor to perform a method of:
- impersonating a legitimate network-based device;
- receiving one or more data packets at a DDoS honeypot of a plurality of DDoS honeypots from a network;
- determining whether the one or more received data packets are a part of a DDoS attack;
- determining a source address of at least one of the data packets corresponding to the DDoS attack;
- refraining from performing at least one action expected by a source of the data packet in response to the determination that the one or more received data packets are part of the DDoS attack, the refraining from performing the at least one action comprising refraining from sending traffic to the source in response to at least one request;
- sending a network traffic log to a central controller in response to the DDoS honeypot determining that the one or more received data packets are part of the DDoS attack, the network traffic log comprising the source address and additional information for at least a plurality of the data packets, the central controller being configured to analyze network traffic logs from a plurality of honeypots and to initiate a mitigation action for any of a plurality of network devices; and
- initiating the mitigation action based on the network traffic log and one or more mitigation rules, wherein the determination of whether the received data packet is part of the DDoS attack is based on one or more detection rules.

19. The system of claim 1, wherein the central controller is further configured to extract the source address from the network traffic log and generate one or more rules to mitigate the DDoS attack.

20. The system of claim 1, wherein an additional network traffic log is sent to the central controller.

21. The system of claim 1, further comprising at least one network router; and wherein the at least one of the DDoS honeypots is further configured to determine an intended victim IP address and type of attack and to send the intended victim IP address and the type of attack corresponding to the received one or more data packets to the central controller and wherein the central controller is further configured to identify the one or more mitigation rules to mitigate the attack traffic directed to the intended victim IP address and to send the one or more mitigation rules to a network router of the at least one network router that handles the traffic directed to the intended victim IP address, wherein the network router that handles the traffic implements the one or more mitigation rules to mitigate the attack against the intended victim IP address.

* * * * *